US00RE46941E

(19) United States
(12) Reissued Patent
Jansson

(10) Patent Number: US RE46,941 E
(45) **Date of Reissued Patent: *Jul. 10, 2018**

(54) TOOL SETTER FOR A GRINDING MACHINE

(71) Applicant: Tormek AB, Lindesberg (SE)

(72) Inventor: Torgny Jansson, Lindesberg (SE)

(73) Assignee: Tormek AB, Lindesberg (SE)

( * ) Notice: This patent is subject to a terminal disclaimer.

(21) Appl. No.: 14/500,074

(22) Filed: Sep. 29, 2014

Related U.S. Patent Documents

Reissue of:
(64) Patent No.: 8,556,685
Issued: Oct. 15, 2013
Appl. No.: 12/591,277
Filed: Nov. 16, 2009

U.S. Applications:
(63) Continuation of application No. 11/703,725, filed on Feb. 8, 2007, now Pat. No. 7,686,678.

(30) Foreign Application Priority Data

Feb. 10, 2006 (SE) ..... 0600292

(51) Int. Cl.
*B24B 21/18* (2006.01)
*B24B 3/38* (2006.01)
*B24B 41/06* (2012.01)

(52) U.S. Cl.
CPC ..... *B24B 3/38* (2013.01); *B24B 41/066* (2013.01)

(58) Field of Classification Search
CPC ..... G01B 3/56; B24B 21/18; B24B 41/066
See application file for complete search history.

(56) References Cited

U.S. PATENT DOCUMENTS

| | | | | | |
|---|---|---|---|---|---|
| 2,125,545 | A | * | 8/1938 | Coleman | G01B 3/56 33/474 |
| D206,086 | S | * | 10/1966 | Oltean | D10/64 |
| 3,855,735 | A | | 12/1974 | Tateisi et al. | |
| 3,874,121 | A | | 4/1975 | Kikuchi et al. | |
| 3,942,253 | A | | 3/1976 | Gebel et al. | |
| 4,106,241 | A | | 8/1978 | Fisk | |
| 4,217,734 | A | | 8/1980 | Frei | |
| 4,244,118 | A | | 1/1981 | Matuszak | |
| 4,291,466 | A | | 9/1981 | Bell et al. | |
| 4,338,749 | A | * | 7/1982 | Kiser | 451/369 |
| 4,433,488 | A | | 2/1984 | Baumgartner | |
| 4,437,239 | A | | 3/1984 | Possati | |
| 4,506,447 | A | | 3/1985 | Lob | |

(Continued)

FOREIGN PATENT DOCUMENTS

EP 0 957 331 11/1999

OTHER PUBLICATIONS

Civil Cover Sheet filed Jul. 18, 2014 (2 pages).

(Continued)

*Primary Examiner* — Jeffrey L Gellner
(74) *Attorney, Agent, or Firm* — Merchant & Gould P.C.

(57) ABSTRACT

A device or tool setter has the purpose of setting the position of a support bar, adjustably connected to a grinding machine, in relation to a rotatable grindstone of the machine for obtaining a desired edge angle of a tool supported for grinding by the support bar. The device is provided with discs for defining two contact points with the grindstone and a hole for connection to the support bar.

6 Claims, 3 Drawing Sheets

(56) References Cited

U.S. PATENT DOCUMENTS

| | | | | |
|---|---|---|---|---|
| 4,524,546 | A | 6/1985 | Hoover et al. | |
| 4,571,841 | A | 2/1986 | Campbell | |
| 4,584,774 | A | 4/1986 | Link | |
| 4,648,210 | A | 3/1987 | Reinmold et al. | |
| 4,745,689 | A * | 5/1988 | Hiltz | 33/451 |
| 4,785,550 | A | 11/1988 | Wilkins | |
| 4,903,413 | A | 2/1990 | Bellwood | |
| 4,958,442 | A | 9/1990 | Eckhardt | |
| 5,144,773 | A | 9/1992 | Flores et al. | |
| 5,172,484 | A * | 12/1992 | Triola | 33/534 |
| 5,184,428 | A | 2/1993 | Feldt et al. | |
| 5,337,485 | A | 8/1994 | Chien | |
| 5,551,906 | A | 9/1996 | Helgren | |
| 5,632,096 | A | 5/1997 | Horvath | |
| 5,685,085 | A | 11/1997 | Bond | |
| 5,761,821 | A | 6/1998 | Laycock | |
| 6,019,664 | A | 2/2000 | Tsai et al. | |
| 6,073,357 | A | 6/2000 | Kosmalski | |
| 6,101,733 | A | 8/2000 | Horvath | |
| 6,189,225 | B1 | 2/2001 | Jansson | |
| 6,393,712 | B1 * | 5/2002 | Jansson | 33/628 |
| 6,623,340 | B2 * | 9/2003 | Jansson | 451/241 |
| 6,690,991 | B1 | 2/2004 | Kobayashi | |
| D490,729 | S * | 6/2004 | Chudek et al. | D10/64 |
| 6,742,273 | B2 | 6/2004 | Nagatsuka et al. | |
| 6,935,937 | B2 | 8/2005 | Port | |
| 7,047,658 | B2 | 5/2006 | Danielli et al. | |
| 7,159,477 | B2 | 1/2007 | Edwin et al. | |
| 7,350,314 | B2 | 4/2008 | McCambridge et al. | |
| 7,428,784 | B1 | 9/2008 | Antonello | |
| 7,686,678 | B2 * | 3/2010 | Jansson | 451/442 |
| 2005/0090184 | A1 * | 4/2005 | Zhang et al. | 451/5 |
| 2006/0057946 | A1 | 3/2006 | Evans | |
| 2006/0211348 | A1 | 9/2006 | Hyde et al. | |
| 2007/0218818 | A1 * | 9/2007 | Schwaiger et al. | 451/359 |
| 2010/0203808 | A1 | 8/2010 | Hout et al. | |

OTHER PUBLICATIONS

Complaint filed Jul. 18, 2014, including exhibits A & B (36 pages).
Notice of Voluntary Dismissal with Prejudice filed Jan. 23, 2015 (2 pages).
Report on the Filing mailed Jan. 28, 2015 (1 page).
Civil Docket Case noting matter closed retrieved Mar. 16, 2015 (2 pages).

* cited by examiner

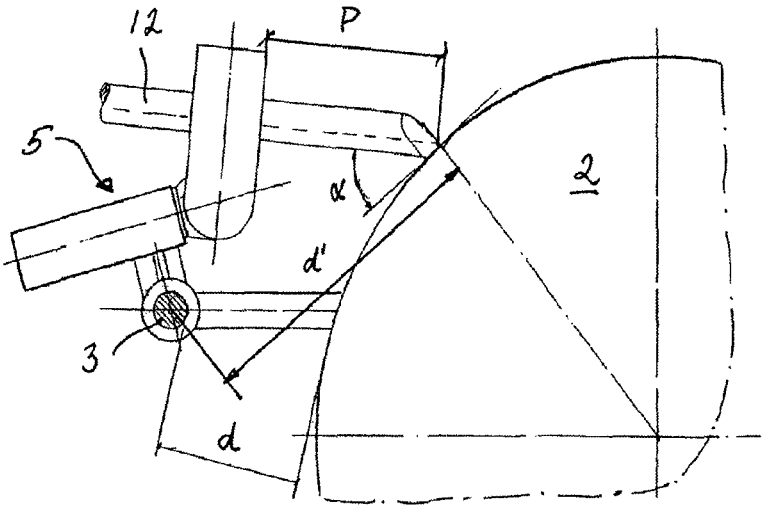
Fig 3
Fig 4
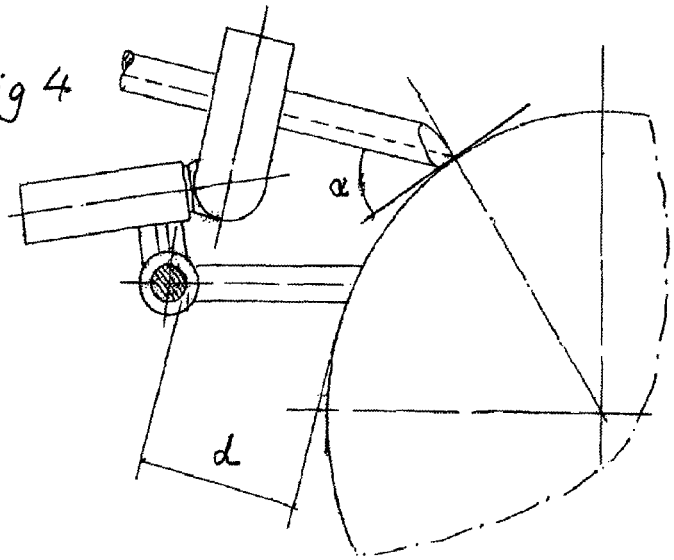

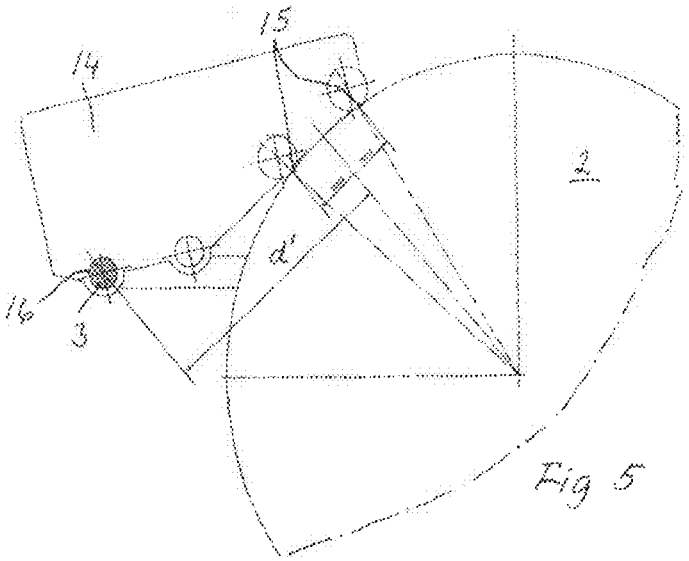
Fig 5
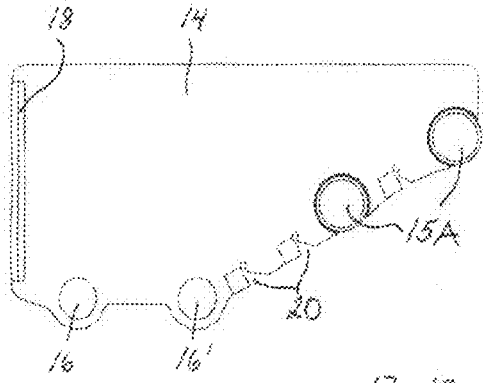
Fig 6
Fig 7
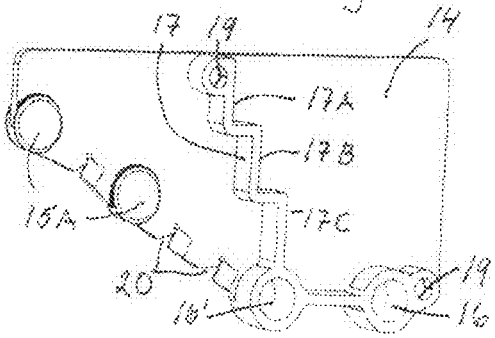

TOOL SETTER FOR A GRINDING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue application of U.S. Pat. No. 8,556,685 issued on Oct. 15, 2013, which issued from U.S. Ser. No. 12/591,277 filed on Nov. 16, 2009, which is a continuation of U.S. Ser. No. 11/703,725, filed Feb. 8, 2007, and now U.S. Pat. No. 7,686,678, which claims benefit of Serial No. 0600292 filed on Feb. 10, 2006 in Sweden. A claim of priority to each of U.S. Ser. No. 12/591,277, U.S. Ser. No. 11/703,725, and SE Serial No. 0600292 is made to the extent appropriate. Also, U.S. Ser. No. 12/591,277, U.S. Ser. No. 11/703,725, and SE Serial No. 0600292 are incorporated herein by reference, in their entirety.*

TECHNICAL FIELD

The present invention relates to a device, hereinafter also referred to as a tool setter, for setting the position of a support bar, adjustably connected to a grinding machine, in relation to a rotatable grindstone of the machine for obtaining a desired edge angle of a tool supported for grinding by the support bar.

BACKGROUND OF THE INVENTION

Edge tools, for example for woodworking, especially woodturning tools, have to be sharp for obtaining optimum results. Sharpening can be performed by means of a rotating grindstone in a grinding machine. The sharpening is preferably carried out by means of a jig, in which the tool is attached and which is supported by a support bar of the machine. In this way an exact replication of the edge shape and edge angle of a previous sharpening can be obtained.

Hereby, the shape of the edge is exactly the same after each re-sharpening, so that the tool always behaves in the same way at work. With a sharp edge the wood surface becomes finer and may not need sanding or the like.

At re-sharpening of the tool by means of a jig very little steel is removed, and the wear is minimal, prolonging the useful life of a tool.

At a re-sharpening by means of the jig supported by the support bar, a replicated result is only possible with the same jig, with the same protrusion of the tool from the jig, and above all with the same distance between the support bar and the grindstone as at a previous sharpening.

Traditionally, the distance between the support bar and the grindstone has been established by means of a wooden spacer made by the user at the first sharpening of a tool. This is a rather awkward process, also with an inherent risk of then loosing a particular wooden spacer. Different spacers may be needed for different tools. Each spacer will lead to a copying of the edge geometry obtained at a previous sharpening. The precision of the result is depending on the skill and accuracy of the user. Further, the spacer can not be used with a grindstone with another diameter than the original one, if a replicated edge angle is desired.

The main object of the invention is to enable a proper, replicated setting by means of a commercially available device, also with a grindstone of another diameter than of the one previously used.

Another object of the invention is to attain a device for simplifying the setting of the support bar with the highest possible accuracy.

THE INVENTION

This is according to the invention attained in that the device is provided with means for defining two contact points with the grindstone and with means for connection to the support bar.

In a practical embodiment, the device may consist of a card or plate, preferably of plastic, whereas the means for defining the contact points can be metal discs attached in the plate, and the means for connection to the support bar may be a hole in the plate.

In order to improve the versatility of the device and allow more tool edge shapes and angles to be obtained, the plate may be provided with at least one further hole for optional connection to the support bar.

A replicated sharpening result is dependent on the use of the same protrusion of the tool from a jig utilized at grinding. For facilitating the setting of this protrusion, the plate is provided with a projection forming shoulders at different distances from an edge of the plate.

The plate may be provided with magnets for attachment of the device to a metal surface, for example the grinding machine, so as to prevent it from being lost.

An edge of the plate may be provided with grooves for checking an edge angle of a tool, for example before and after a sharpening.

BRIEF DESCRIPTION OF THE DRAWINGS

The invention will be described in further detail below under reference to the accompanying drawings, in which FIGS. 3 and 4 illustrate tool sharpening under two different conditions and the prevailing geometrical relationships, FIG. 5 is a somewhat schematic side view of the device or turning tool setter according to the invention in its use at a grindstone, FIG. 6 is a front view of the turning tool setter according to the invention, and FIG. 7 is a perspective view of the rear side of the turning tool setter according to the invention.

DETAILED DESCRIPTION OF EMBODIMENTS

Figure 1:
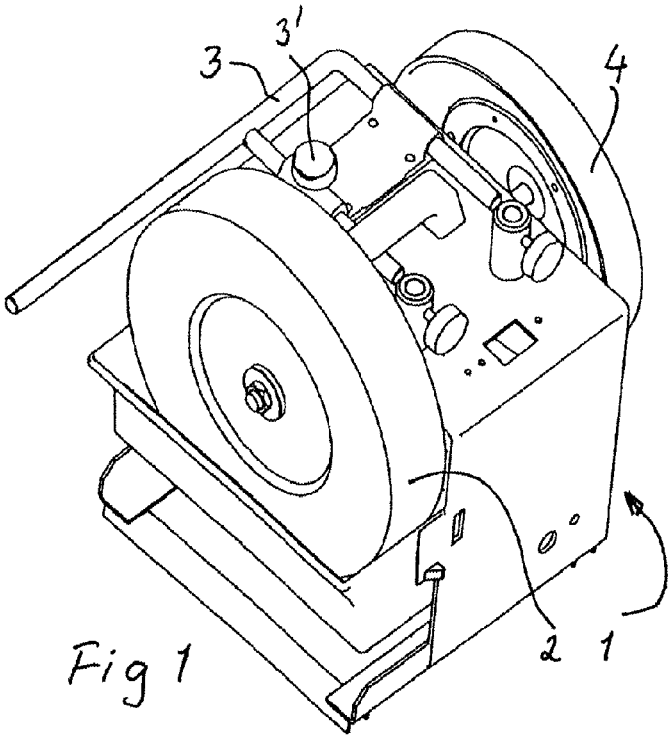
FIG. 1 is a perspective view of an exemplary grinding machine, with which a device or turning tool setter according to the invention may be used.

A conventional grinding machine 1 is shown in FIG. 1. The machine is provided with a circular grindstone 2 driven by an electric motor in the machine. The machine is provided with a cylindrical support bar 3. The purpose of the support bar 3 is to serve as a guiding means, as will appear below. The distance between the grindstone 2 and the support bar 3 parallel therewith may be adjusted by the slidable mounting of the support bar 3 to the grinding machine 1. The distance may be fixed by a set screw 3' on the machine.

The grinding machine 1 may also be provided with a honing wheel 4.

Figure 2:
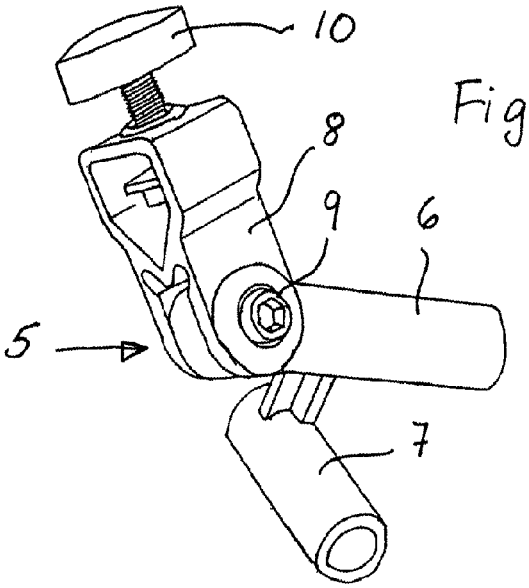
FIG. 2 is a perspective view to a larger scale of a jig to be used at sharpening of a turning tool by means of the grinding machine.

When edge tools, especially woodturning tools, such as chisels and gouges, most importantly spindle gouges, bowl gouges and plain or oval skew chisels, are to be sharpened by means of the grinding machine 1, use can be made of a jig 5 to be briefly described with reference to FIG. 2. The jig has a base member 6 with a support bar tube 7 attached perpendicularily thereto. The inner diameter of the tube 7 corresponds to the outer diameter of the support bar 3. A tool holder 8 is pivotally attached to the base member 6, and the relative position between these two parts may be locked by means of a lock screw 9. A tool received in the tool holder 8 may be held in position by means of a holding screw 10.

Reference is now made to FIG. 3, which illustrates the sharpening of a woodturning tool 12, in the shown instance a bowl gouge, by means of the grindstone 2. The tool 12 is fastened in the jig 5, which is slid onto the support bar 3, attached in the grinding machine 1 (FIG. 1). It is assumed throughout the following description that the base member 6 and the tool holder 8 (FIG. 2) of the jig 5 are locked to each other, in the present case forming an angle of 110° with each other.

With a certain protrusion P of the tool 12 out from the jig 5, a certain edge angle $\alpha$ of the tool can be obtained, provided that the correct distance d between the grindstone 2 and the support bar 3 is set. As the edge angle $\alpha$ is of great importance for the work with the tool, it imperative to obtain the same edge angle at a re-sharpening of the tool. As is understood, this is obtained by setting the support bar 3 at the same distance d from the grindstone as at the previous sharpening (s) (provided that the tool 12 is fastened to the jig 5 with the same protrusion P as earlier).

It has earlier been customary to physically "memorize" the distance d by means of a wooden spacer or distance piece, prepared by the user.

In the specific case illustrated in FIG. 3, the grindstone 2 has a diameter of 250 mm. With the described jig setting and tool protrusion, the distance d will be about 51.5 mm for a desired edge angle $\alpha$ of 45°. If on the other hand, as illustrated in FIG. 4, the grindstone has a diameter (possibly after wear) of only 200 mm, the desired edge angle $\alpha$ of 45° will be obtained with a different distance d of about 57 mm.

In order to obtain a correct and desired edge angle $\alpha$ each time a specific tool 12 is re-sharpened and independent of the diameter of the grindstone 2, a device or tool setter 14 according to the invention may be used for setting the correct position for the support bar 3 in relation to the grindstone 2. As appears in FIG. 5, this tool setter 14, which will be further described below under reference to FIGS. 6 and 7, is a flat utensil with two spaced-apart contact points 15 for application against the grindstone 2 and with at least one circular hole 16 for engagement with the support bar 3.

In order to obtain a proper and replicated position for the support bar 3 in relation to a grindstone 2 (with any diameter) the tool setter 14 is slid onto the bar 3 by its hole 16, whereupon the position of the support bar 3 is adjusted, until both the two contact points 15 bear against the surface of the grindstone 2, and the support bar 3 is locked into the set position.

The tool setter 14 is removed, and the jig 5 with the tool 12 attached therein (with the proper protrusion) is mounted on the support bar 3, whereupon the tool 12 can be re-sharpened with the desired edge angle.

As it has earlier been customary to "memorize" the position of the support bar 3 by means of a distance piece or spacer inserted between the bar and the grindstone 2, the geometry shown and described with relation to FIGS. 3 and 4 is based on the distance d between the bar and the grindstone. However, it may also be defined—as in FIG. 5—as a perpendicular distance d' between a grindstone radius (intermediate the two contact points 15) and the support bar 3. Reverting back to FIG. 3, this distance d' is also the distance between the support bar 3 and the engagement of the tool 12 with the grindstone 2.

The tool setter 14 is shown in FIGS. 6 and 7. Basically, it may in a practical embodiment consist of a card or plate preferably made of plastic with a generally parallel trapezoid shape. It is provided with two metal discs 15A (for defining the contact points 15 mentioned above). It is also provided with circular holes 16 and 16'. The first or left hole 16 has been mentioned above, and the second or right hole 16' has the purpose of enabling sharpening with different parameters (edge angle, type of tool, etc). It is presently felt that two holes 16, 16' satisfy normal needs, but it is of course possible to provide further holes.

It has been mentioned above that the protrusion P of the tool 12 from the jig 5 is of importance for the obtained replicated result. An accurate setting of a desired protrusion P may be obtained in that the rear side of the tool setter 14—as is shown in FIG. 7—is provided with a projection 17, forming for example three shoulders 17A, 17B and 17C at a distance of for example 75 mm, 65 mm and 55 mm, respectively, from the right hand edge of the tool setter 14 in FIG. 7. The opposite or front side of the tool setter 14 is preferably at this edge provided with a ledge 18 for supporting engagement with a suitable edge of a table or the like.

Magnets 19 for holding or storing the tool setter 14 on a metal surface, for example the grinding machine 1, ready for easy access may be provided on the rear side of the tool setter 14, as is indicated in FIG. 7.

Grooves 20 for checking edge angles may be provided at an edge of the tool setter 14.

The tool setter 14 may on free surfaces be provided with appropriate text and illustrations for guiding the user about proper settings for different tools. Consultations with many experienced woodturners have shown that with a tool setter 14 having two holes 16 and 16' and having directions for use of the three protrusions P of 55, 65 and 75 mm, tool shapes and edge angles that can satisfy most needs will be obtained.

With the tool setter 14 according to the invention a very exact replication of an edge angle of a certain tool may be obtained, even when the grindstone diameter changes.

The tool setter 14 has been shown as being provided with two fixed metal discs 15A and two fixed holes 16 and 16'. Deviations are possible within the scope of the appended claims, for example with regard to the number and positions of the support bar holes. Also, it is possible to provide for adjustability for the positions of both the contact points (metal discs) and the support bar connection means (holes).

The invention claimed is:

[1. A device for setting a position of a support bar, said bar being adjustably connected to a grinding machine in relation to a rotatable grindstone of the grinding machine, for obtaining a desired edge angle of a tool supported for grinding by the support bar, the device comprising a one-piece plate having as a part thereof (1) spaced apart protrusions which define two contact points with the grindstone in order to repeatedly define a distance d between the grindstone and the support bar, as well as provide for adjustment of position of the support bar so as to repeatedly obtain an edge angle α for a tool upon re-sharpening the tool with said grindstone using said support bar and (2) a hole in said plate for pivotal connection to the support bar.]

[2. A device for setting a position of a guiding means, the guiding means being adjustably connected to a grinding machine in relation to a rotatable grindstone of the grinding machine, for obtaining a desired edge angle of a tool supported for grinding by the guiding means, the device comprising a one-piece plate having as a part thereof (1) a means for defining two contact points with the grindstone and (2) a means for cooperation with the guiding means to obtain a desired spacing between said grindstone and said guiding means.]

*3. A combination grinding machine and tool setter comprising:*

*(a) a grinding machine comprising a circular grindstone having an outer circular periphery, a jig support, and a sharpening jig for holding an edge tool for sharpening; and*

*(b) a tool setter comprising:*

*(i) a plate having an outer boundary in a plane of the plate;*

*(ii) a first contact location comprising a first disc, a second contact location comprising a second disc, wherein the first contact location and the second contact location are separate from each other and both the first contact location and the second contact location extend beyond the outer boundary in the plane of the plate, and the tool setter is constructed so that the first contact location and the second contact location simultaneously contact the circular periphery of the circular grindstone, and a third contact location for contacting the jig support;*

*(iii) a first fixed separation between the first and second contact locations and a second fixed separation between the first contact location and the third contact location to provide a separation between the circular grindstone and the jig support; and*

*(iv) wherein the tool setter is constructed to define the separation between the circular grindstone and the jig support to provide accurate, replicated re-sharpening results of an edge of an edge tool at an angle α when the edge of the edge tool is provided at a constant protrusion P from a jig used with the jig support.*

*4. The combination grinding machine and tool setter according to claim 3, wherein the tool setter is formed of plastic.*

*5. The combination grinding machine and tool setter according to claim 3, wherein the third contact location comprises a circular hole.*

*6. The combination grinding machine and tool setter according to claim 3, wherein the tool setter comprises a flat utensil.*

*7. The combination grinding machine and tool setter according to claim 3, wherein the sharpening jig comprises an edge tool secured therein.*

*8. The combination grinding machine and tool setter according to claim 3, wherein the edge tool comprises one of a spindle gouge, a bowl gouge, a plain chisel, or an oval skew chisel.*

* * * * *